United States Patent
Steinhilber

(10) Patent No.: US 9,053,741 B2
(45) Date of Patent: Jun. 9, 2015

(54) STORAGE CARTRIDGE AND CARTRIDGE DRIVE

(75) Inventor: Friedhelm Steinhilber, Rottweil (DE)

(73) Assignee: BDT MEDIA AUTOMATION GMBH, Rottweil (DE)

( * ) Notice: Subject to any disclaimer, the term of this patent is extended or adjusted under 35 U.S.C. 154(b) by 929 days.

(21) Appl. No.: 13/241,652

(22) Filed: Sep. 23, 2011

(65) Prior Publication Data

US 2013/0080713 A1 Mar. 28, 2013

(51) Int. Cl.
- *G11B 33/12* (2006.01)
- *G06F 1/16* (2006.01)
- *G11B 23/04* (2006.01)
- *G11B 25/04* (2006.01)
- *G06F 1/18* (2006.01)

(52) U.S. Cl.
CPC ............ *G11B 23/049* (2013.01); *G11B 33/124* (2013.01); *G06F 1/1632* (2013.01); *G11B 25/043* (2013.01); *G06F 1/187* (2013.01)

(58) Field of Classification Search
USPC ............ 360/99.13, 99.14, 99.25; 361/679.33, 361/679.36, 679.41
See application file for complete search history.

(56) References Cited

U.S. PATENT DOCUMENTS

| | | | | |
|---|---|---|---|---|
| 5,175,657 A * | 12/1992 | Iftikar et al. | ................ | 360/98.01 |
| 5,235,481 A * | 8/1993 | Kamo et al. | ................ | 360/99.13 |
| 5,412,522 A * | 5/1995 | Lockhart et al. | ............ | 360/99.14 |
| 5,737,185 A * | 4/1998 | Morrison et al. | ........ | 361/679.39 |
| 6,061,232 A * | 5/2000 | Ho | ............................ | 361/679.31 |
| 6,411,522 B1 * | 6/2002 | Frank et al. | .................... | 361/800 |
| 6,490,242 B1 * | 12/2002 | Bonn et al. | ..................... | 720/738 |
| 6,650,961 B2 * | 11/2003 | Deckers | ......................... | 700/213 |
| 6,837,718 B2 * | 1/2005 | Brodsky et al. | ................. | 439/67 |
| 6,873,524 B2 * | 3/2005 | Kaczeus et al. | .......... | 361/679.33 |
| 7,136,720 B2 | 11/2006 | Deckers | | |
| 7,359,187 B2 * | 4/2008 | Hu et al. | ................... | 361/679.33 |
| 7,386,868 B2 * | 6/2008 | McCormack | ................. | 720/657 |
| 7,484,291 B1 * | 2/2009 | Ostrander et al. | ......... | 29/603.03 |
| 7,508,622 B2 | 3/2009 | Martin et al. | | |
| 7,535,697 B2 * | 5/2009 | Robertson et al. | ....... | 361/679.38 |
| 7,768,739 B2 * | 8/2010 | Starr et al. | .................... | 360/92.1 |
| 8,085,501 B2 * | 12/2011 | Martin | .......................... | 360/133 |
| 2002/0196580 A1 * | 12/2002 | Tsukahara et al. | ......... | 360/97.01 |
| 2004/0098244 A1 | 5/2004 | Dailey et al. | | |
| 2005/0135000 A1 * | 6/2005 | Kao et al. | .................... | 360/97.01 |
| 2005/0248916 A1 * | 11/2005 | Huang | .......................... | 361/685 |

(Continued)

OTHER PUBLICATIONS

European Patent Office, International Search Report in International Patent Application No. PCT/EP2012/067881 (Nov. 28, 2012).

*Primary Examiner* — Brian Miller
(74) *Attorney, Agent, or Firm* — Leydig, Voit & Mayer, Ltd.

(57) ABSTRACT

A docking station for receiving a cartridge includes a housing having a receiving space configured to receive the cartridge. A movable carriage is disposed in the receiving space and configured to transport the cartridge into the receiving space. A movable mouth piece is configured to at least partially surround a multipoint connector of a non-tape storage medium of the cartridge through a horizontal access side opening of the cartridge so as to fix the multipoint connector. A fixing slider is configured to move the mouth piece through the horizontal access side opening so as to fix the multipoint connector within the receiving space. A connector slider is configured to move a connector within the docking station through a vertical access bottom opening of the cartridge against the electrical multipoint connector.

22 Claims, 9 Drawing Sheets

(56) References Cited

U.S. PATENT DOCUMENTS

| | | | |
|---|---|---|---|
| 2008/0019036 A1* | 1/2008 | Chu et al. | 360/97.01 |
| 2008/0112125 A1* | 5/2008 | Martin et al. | 361/685 |
| 2008/0244145 A1* | 10/2008 | Kramlich et al. | 710/304 |
| 2013/0080713 A1* | 3/2013 | Steinhilber | 711/154 |
| 2013/0117488 A1* | 5/2013 | Perry et al. | 710/304 |

* cited by examiner

Isometric View

Bottom View connecting link guide horizontal groove  gear train  Motor

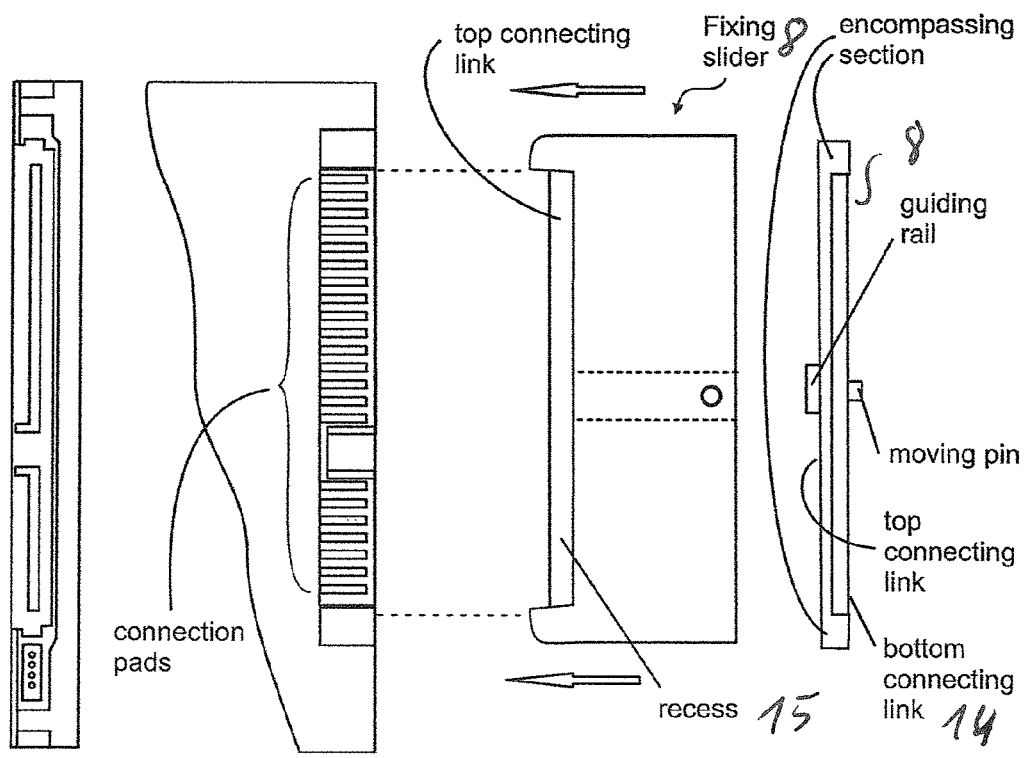
Fig. 9a
Fig. 9b
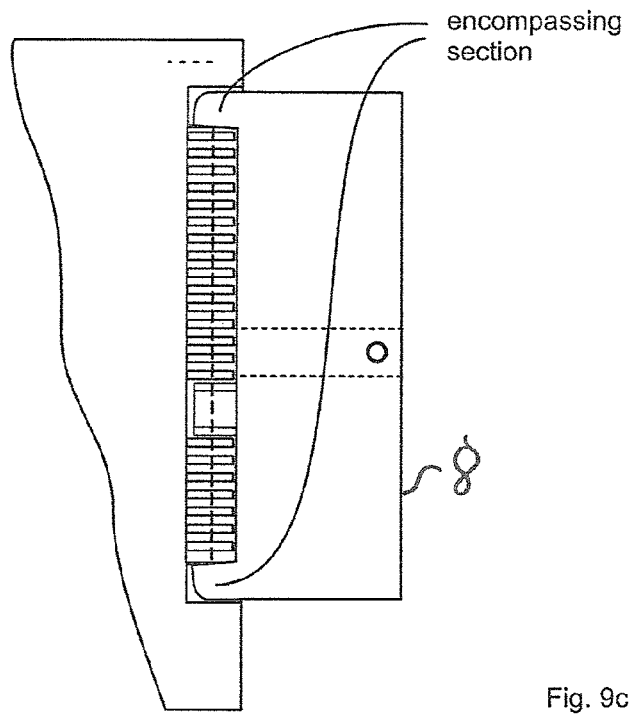
Fig. 9c

Vertical slider

STORAGE CARTRIDGE AND CARTRIDGE DRIVE

FIELD

The present invention generally relates to a data storage cartridge and an associated cartridge drive and the establishment of a contact between both. More particularly, the present invention relates to a data storage cartridge in LTO format for housing a non-tape storage medium like a hard disk or flash disk and an electrical connection between the data storage cartridge and the associated tape drive.

BACKGROUND

Data storage tape cartridges have been used for decades in the computer, audio, and video fields as a means for storing electronic files. Tapes are linear storage mediums. The data storage tape cartridges continue to be a popular form of recording large volumes of information for subsequent retrieval and use, particularly in a library setting. Automated, data storage tape cartridge libraries provide access to vast amounts of electronic data by storing and managing data storage tape cartridges. In these tape cartridge libraries the tapes are transported from a slot in which the tapes are stored to the drive to read or write data. The most popular tapes are Linear Tape-Open (LTO) Tapes which are available in different generations from LTO1 to LTO5.

In a conventional, automated, data storage tape cartridge library system, an automation unit, such as a robotic arm or other mechanism, typically services a plurality of data storage tape cartridge locations. The automation unit selectively retrieves a data storage tape cartridge from one of the storage locations and loads the retrieved data storage tape cartridge into a designated tape drive. The tape drive reads data from or writes new data to the data storage tape cartridge. When the tape drive is finished with the data storage tape cartridge, the automation unit retrieves the data storage tape cartridge from the tape drive and returns the data storage tape cartridge to the assigned storage location. A host computing system typically communicates with the library controlling unit to control the operation of the automated cartridge library. The communication is performed over the Small Computer System Interface (SCSI), Fibre Channel (FC) or Serial Attached SCSI (SAS) bus. In this way, a large number of data storage tape cartridges are automatically accessible by one or more tape drives.

To manipulate a data storage tape cartridge, the automation unit typically includes an interface, such as a gripper on a robotic arm, that engages the data storage tape cartridge and allows the automation unit to convey and manipulate the orientation of the data storage tape cartridge. Because the data storage tape cartridges must be positioned in a precise manner for the robotic arm to grasp and position them correctly, the data storage tape cartridges and the storage locations are constructed with exact dimensions. Accordingly, the data storage tape cartridges that the library system houses typically have substantially similar, if not identical, form factors in order to be properly received by the interface of the automation unit. Notably, during the life of a typical data storage tape cartridge within the library system, the data storage tape cartridge undergoes a plurality of connection and disconnection (i.e., insertion and removal) cycles with the one or more associated tape drives.

Although conventional, automated libraries provide access to vast amounts of information, the data storage tape cartridges do not allow for true random access of files stored on the data storage tape cartridges. In particular, a conventional data storage data tape cartridge consists of a tape, i.e., an elongated flexible medium having a magnetic recording layer, wound on one or more wheels or hubs. Data is recorded and retrieved by inserting the data storage tape cartridge within a tape drive and passing the recording medium in front of one or more read/write heads. The tape drives are usually streaming devices in which data is recorded in a serpentine fashion as the tape streams back and forth. In particular, the tape drive typically writes the data along a number of tracks that span the length of the medium. For this reason, data storage tape cartridges can be viewed as sequentially storing the data in a linear format.

The linear data storage format prevents true random access to individual files. In particular, a tape drive must scan through the entire length of the tape until the appropriate file mark is identified, thereby increasing the file retrieval time. Due to the lack of true random access to individual files stored within the data storage tape cartridges and the affinity for the pre-existing automated, data storage tape cartridge library systems, a need exists for a data storage cartridge configured to house and protect a random access storage medium and yet be compatible with conventional, automated, data storage tape cartridge library systems.

However, typical connections with many non-tape storage mediums are not configured to withstand a plurality of connection and disconnection cycles. For example, hard drives are typically electrically connected to other interfaces by sliding connection pins over the hard drive connection pads. Repeated sliding of the connection pins over the pads may eventually wear away the conductive plating on the pads and, thereby, gradually disintegrate the integrity of the electrical connection. Therefore, the present invention recognizes a need to form a selective electrical connection between a non-tape storage medium housed within a data storage cartridge and an associated cartridge drive capable of maintaining its integrity through a plurality of connection and disconnection cycles.

U.S. Pat. No. 7,136,720 B2 describes methods and an apparatus for storing data which employ a hard disk memory media which is operably supported within a cartridge shell to form a disk cartridge. The disk cartridge can be employed in the manner of a tape cartridge wherein the disk cartridge can be stored in a communicatively isolated condition until required for read-write operations whereupon the disk cartridge can be communicatively linked to another device which transmits data to, or receives data from, the disk cartridge. The disk cartridge can adhere to a given tape cartridge form factor so as to enable both tape cartridges and disk cartridges to be employed together in a single automated library system.

U.S. Pat. No. 6,650,961 B2 shows methods and an apparatus for storing data which employ a hard disk memory media which is operably supported within a cartridge shell to form a disk cartridge. The disk cartridge can be employed in the manner of a tape cartridge wherein the disk cartridge can be stored in a communicatively isolated condition until required for read/write operations whereupon the disk cartridge can be communicatively linked to another device which transmits data to, or receives data from, the disk cartridge. The disk cartridge can adhere to a given tape cartridge form factor so as to enable both tape cartridges and disk cartridges to be employed together in a single automated library system.

U.S. Pat. No. 7,508,622 B2A shows a data storage cartridge comprising a hard drive and a cartridge housing. The hard drive includes a non-tape storage medium and an electronic data connector including a plurality of connection pads for accessing the non-tape storage medium. The cartridge housing substantially encloses the hard drive. The plurality of connection pads are transversely accessible by a cartridge drive.

The hard disk within the cartridge housing is elastically supported to protect the hard disk from shocks. The elastical shock absorbers may lead to an inaccuracy when connecting a connector of the hard drive with the connector of the docking station.

SUMMARY

In an embodiment, the present invention provides a docking station for receiving a cartridge including a non-tape storage medium. The cartridge has a horizontal access side opening and a vertical access bottom opening so as to expose an electrical multipoint connector of the non-tape storage medium. Contact pads of the multipoint connector are accessible through the vertical access bottom opening. The docking station includes a housing having a receiving space configured to receive the cartridge. A movable carriage is disposed in the receiving space and configured to transport the cartridge into the receiving space. A movable mouth piece is configured to at least partially surround the multipoint connector through the horizontal access side opening so as to fix the multipoint connector in a predetermined position in at least two dimensions. A fixing slider is configured to move the mouth piece through the horizontal access side opening so as to fix the multipoint connector within the receiving space. A connector slider is configured to move a connector within the docking station through the vertical access bottom opening against the electrical multipoint connector of the cartridge after the fixing slider has fixed the cartridge.

BRIEF DESCRIPTION OF DRAWINGS

The present invention will be described in even greater detail below based on the exemplary figures. The invention is not limited to the exemplary embodiments shown in the figures. Other features and advantages of various embodiments of the present invention will become apparent by reading the following detailed description with reference to the attached drawings which illustrate the following:

FIG. 9a shows the connection pads of the hard-drive;
FIG. 9b shows the fixing slider from a bottom and a side view;
FIG. 9c shows the fixing slider moved over the connection pads.

DETAILED DESCRIPTION

Figure 1:
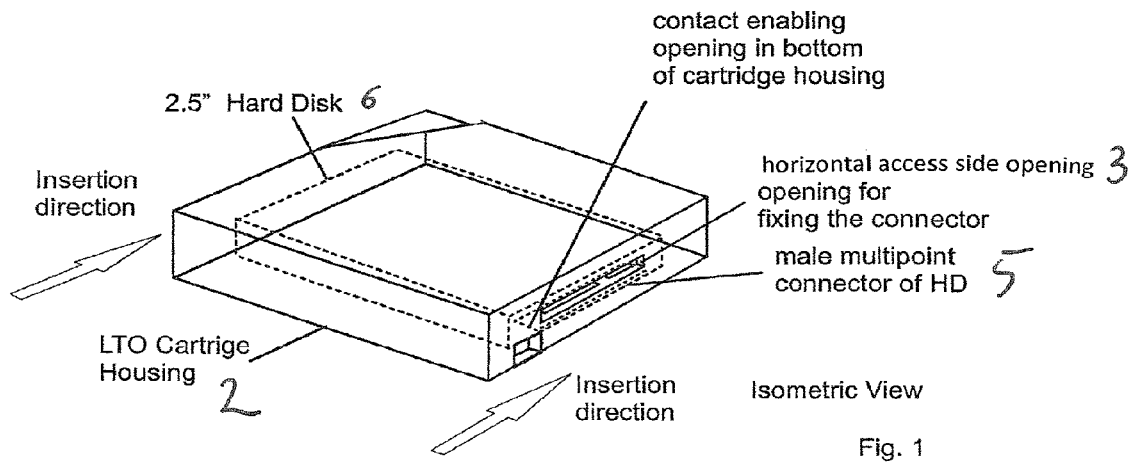
FIG. 1 shows an isometric view of the cartridge.

In an embodiment, the invention provides a docking station 1 for receiving a cartridge 2 comprising a non-tape storage medium, the cartridge has an horizontal access side opening 3 and vertical access bottom opening 4 to expose an electrical multipoint connector of 5 the non-tape storage medium 6. The contact pads of the multipoint connector are accessible through the vertical access bottom opening. In a possible embodiment the multipoint connectors are SAS or Serial Advanced Technology Attachment (SATA) connectors as used for 2.5" or 3.5" (inch) hard drives or solid state drives.

The docking station comprises a housing with a receiving space, to receive the cartridge.

To transport the cartridge into the housing a carriage 7 movable located within the receiving space is used, to transport the cartridge into the receiving space.

The docking station has a movable mouth piece/fixing slider 8 configured to surround the multipoint connector at least partially through the horizontal access side opening, fixing the multipoint connector in a defined position in at least two dimensions. The mouth piece encompasses the multipoint connector providing a recess through which a connector can engage with the multipoint connector.

The docking station has a fixing slider configured to move the mouth piece through the horizontal access side opening, to fix the cartridge within the receiving space.

The docking station has a connector slider configured to move a connector within the docking station through the vertical access bottom opening against the electrical multipoint connector of the cartridge, after the fixing slider 9 has fixed the cartridge.

In a possible embodiment the cartridge has the dimensions according to the Linear Tape-Open (LTO) standard, and wherein the horizontal access side opening is located on a smaller side site and the vertical bottom opening is located on a larger bottom side for the LTO cartridge.

To be able to easily replace LTO Drives in libraries the docking station has the dimension of a LTO drive in 5¼" (inch) half height (HH) or full height (FH).

To allow a seamless replacement of LTO drives the docking station has a controller configured to emulate a tape cartridge on the non-tape-storage medium, allowing a legacy application storing and reading data from the non-tape-storage medium by using tape read and write commands. The tape read and write commands are based on SCSI-commands. The emulation of tapes on a hard disks can be done by different technologies known by a person skilled in the art.

The standard interfaces of the docking stations are ISCSI (Internet Small Computer System Interface), fiber channel, SAS (Serial Attached SCSI), SCSI (Small Computer System Interface).

In a possible embodiment the horizontal side opening and the vertical bottom opening are connected to each other, wherein parts of the edges of the housing of the cartridge are removed, to provide one opening which extends around the edges.

To protect the hard disk within the cartridge the storage medium is located on shock absorbers within the cartridge. The shock absorbers can be made of rubber.

Especially in tape libraries a picker transports the cartridge to the drive/docking station and pushes the cartridge slightly into the opening of the docking station on a carriage. This pushing triggers a sensor. The carriage is configured to be dragged automatically into the docking station, after triggering a sensor by the cartridge when being pushed into the carriage. Also when ejecting the cartridge the carriage transports the cartridge to the gripper by moving the cartridge out of the docking station.

The carriage is dragged by a carriage motor 10 or resilient member after a sensor flag 11 is triggered by the cartridge.

The mechanical fixing slider is moved within a horizontal groove 12 allowing a horizontal displacement of the mouth through the horizontal side opening. The horizontal grove can move the mouth in two dimensions on a track having a S-shape to move the mouth towards the electrical multipoint connector by moving the mouth through the horizontal opening.

In a possible embodiment the mechanical fixing slider is linked to the carriage to be moved together with the carriage. The link can be provided by a mechanical crank or a gear.

It is also possible that the mechanical fixing slider is linked to the carriage motor to be moved together with the carriage. In an alternative embodiment the mechanical fixing slider can have a separate motor driving the carriage.

Also the mechanical connector slider is moved within a vertical groove or track allowing a vertical displacement of the connector to contact the electrical multipoint connector from the bottom side of the cartridge through the vertical access bottom opening. Also the groove or track can have s-shape moving the connector in two dimensions.

The mechanical connector slider can be linked to the carriage to be moved together with the carriage. The link can be provided by a mechanical crank or a gear.

The mechanical connector slider is linked to the carriage motor to be moved together with the carriage.

To fix the multiport connector the mouth piece has left and right encompassing u-shaped or L-shaped sections holding the left and right edges of the multipoint connector. Since the SAS/SATA multiport connectors of the hard disk or flash disks which are located within the cartridge are not developed for several hundred connections the multiport connector has to be supported. To provide a support from the upper site of the connector the mouth piece has an upper connecting link, connecting the right with the left encompassing section.

The mouth piece can also have a bottom connecting link 14, connecting the right with the left encompassing section, wherein the bottom connection link has a recess 15 for the connector extending through the vertical access bottom opening to allow a contact with the electrical multipoint connector.

A further part of an embodiment of the invention is a cartridge comprising a non-tape storage medium, comprising a housing in which the non-tape storage medium is located. The non-tape storage medium has an electrical multipoint connector. The housing has an horizontal access side opening and vertical access bottom opening to expose the electrical multipoint connector of the non-tape storage medium, wherein the horizontal access side opening has a dimension allowing a mouth piece configured to surround and encompass the multipoint connector at least partially extending through the horizontal access side opening.

In the following a possible embodiment of the invention is disclosed without the intention to limit the scope of the invention to the embodiments. The spirit and scope of protection is defined by the following claims and should not be limited to the description of specific embodiments.

One problem recognized and addressed by the present invention is how to implement a hard disk (HD) into a tape based archive system, by using standard components without modifying too many existing legacy components.

One possible solution is LTO drives using the robotic for both the hard disk and the LTO cartridges.

FIG. 1 shows that a standard 2.5" HD/Flash-Drive being incorporated in a LTO cartridge housing being conform in size and dimension with the LTO standard as defined above. FIG. 1 shows that the cartridge has a horizontal access side opening to expose an electrical multipoint connector of the HD/Flash-Drive.

Figure 2:
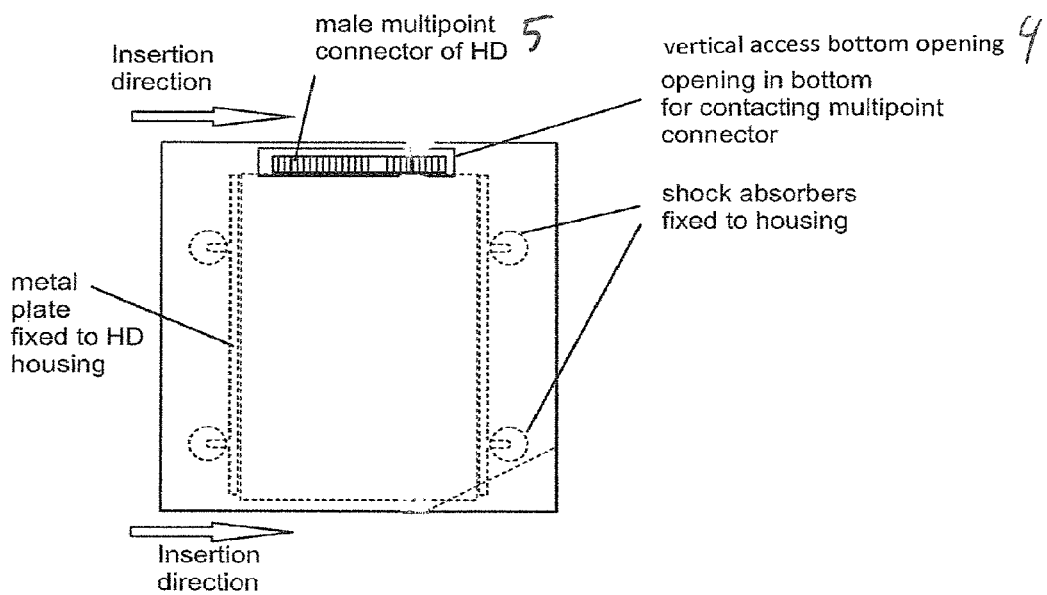
FIG. 2 shows a bottom view of the cartridge.

FIG. 2 shows the cartridge from the bottom side, wherein the contact pads of the multipoint connector are accessible through the second opening a vertical access bottom opening, through which a connector extends. Furthermore the hard disk is mounted on shock absorbers which are fixed in a housing of the cartridge. The shock absorbers may lead to an inaccuracy of the position of the male multipoint connector of the HD. To locate the HD at a defined position the movable mouth piece is introduced which can be positioned in a precise and predictable relation to the connector connecting the multipoint connector of the HD.

Figure 3:
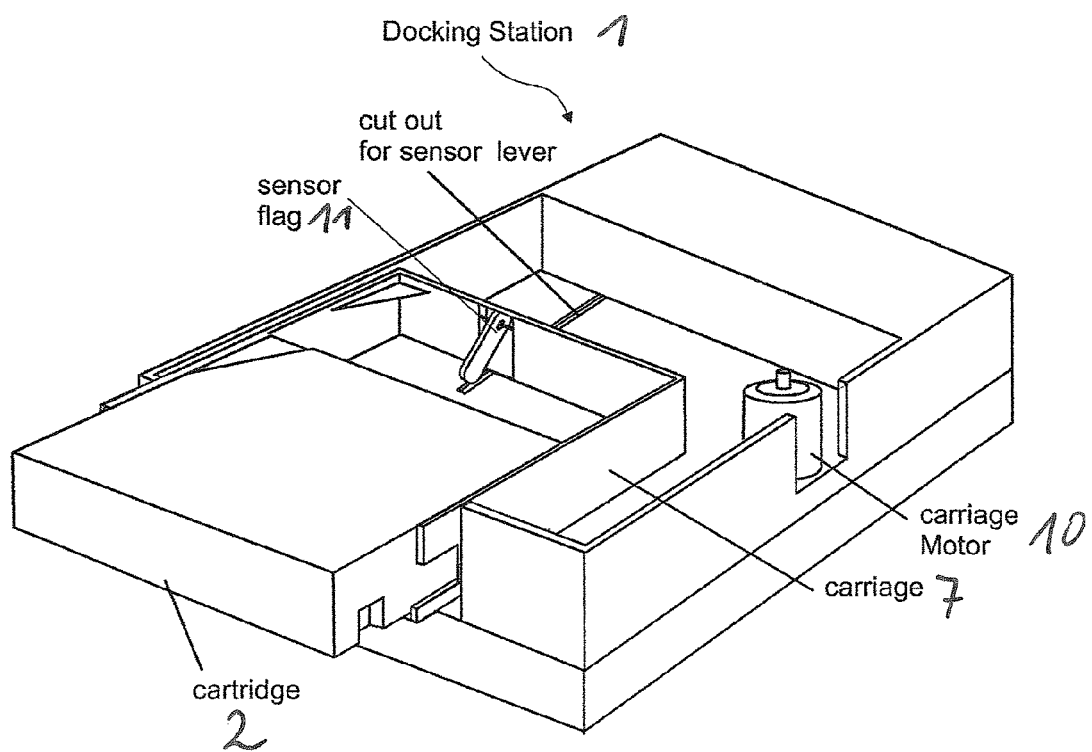
FIG. 3 shows an isometric view of the docking station.

FIG. 3 shows a 5.25" (inch) format half height docking station used to comply with standard cartridge drive dimensions. Other dimensions are also possible.

The HD docking station can be incorporated into a tape archive system wherein tapes and HD can be handled by the robotic and a simultaneous operation of tape and HD is possible.

Usually the HD is inserted in a HD receptacle so the connection is done at the end of the insertion process and in the direction of the insertion.

In an embodiment of the invention, a HD is positioned in an LTO cartridge housing rectangular to the insertion direction, as the width of cartridge is 3 mm higher than length of it. This position of the cartridge versus the housing allows more space for implementing efficient shock absorbers and does provide sufficient space for an elastic movement of the HD in the LTO housing which in case of strong shock is required. This positioning requests a lateral electrical connection is required in such a case for the HD which ideally takes place during insertion of the LTO Cartridge into the carriage.

Figure 5:
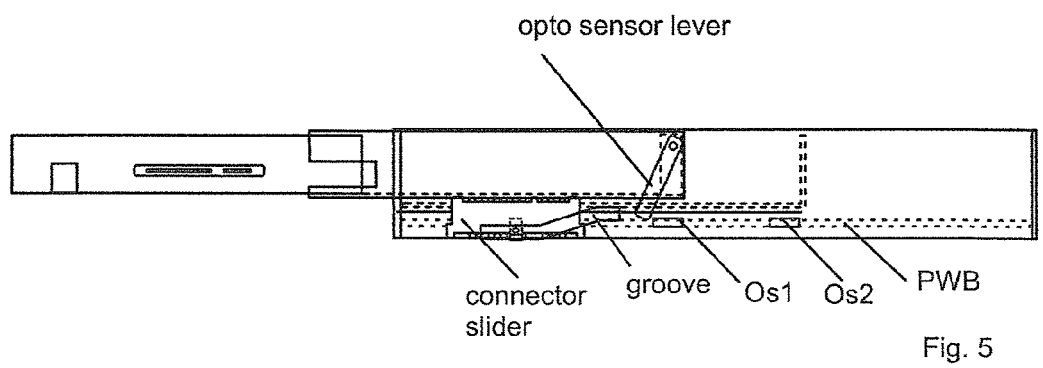
FIG. 5 shows a side view of the docking station when moving the cartridge into the docking station.
Figure 6:
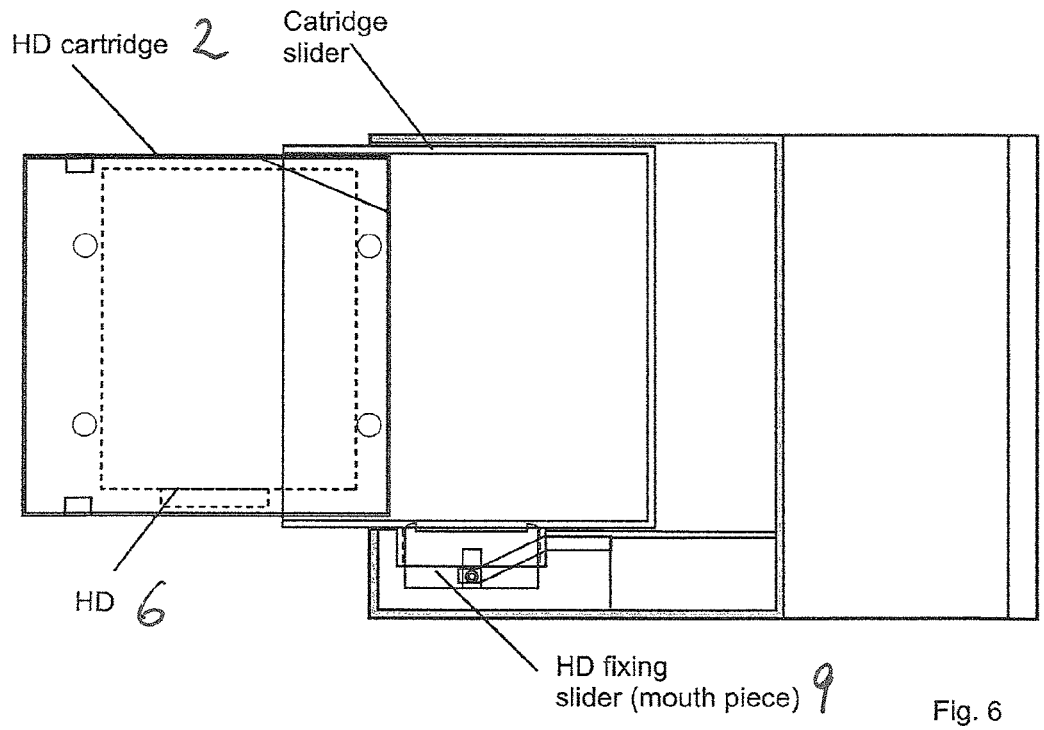
FIG. 6 shows a top view of the docking station.

This can be achieved by means of a connecting link guide (FIG. 5, FIG. 6) which is horizontally arranged and which align the female connector to the male multipoint connector of the hard disk.

Figure 4:
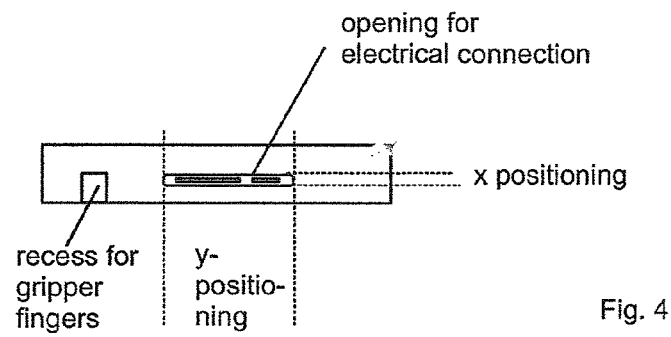
FIG. 4 shows a side view of the cartridge.

A problem for proper and smooth connection in such an insertion mode is determined by the dimensions of the connecting parts. The female connector of the interface has to find the male multipoint connector in the insertion length x and in the vertical direction y (FIG. 4).

Apart from that some real force is needed to completely connect the connector with the multipoint connector of the HD.

To avoid such a problem the electrical connection can be done in a dual way.

The male multipoint connector of the HD firstly is mechanically fixed by means of a sort of mouth piece which is catching the multipoint connector blade in its x and y position.

As the HD is embedded in the relatively soft material of the shock absorbers it is possible to pull it in place however only to a certain degree.

Figure 8A:
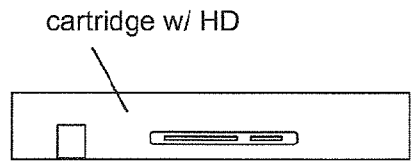
FIG. 8a-8c show a side view for the docking station when moving a cartridge into the docking station.
Figure 8A:
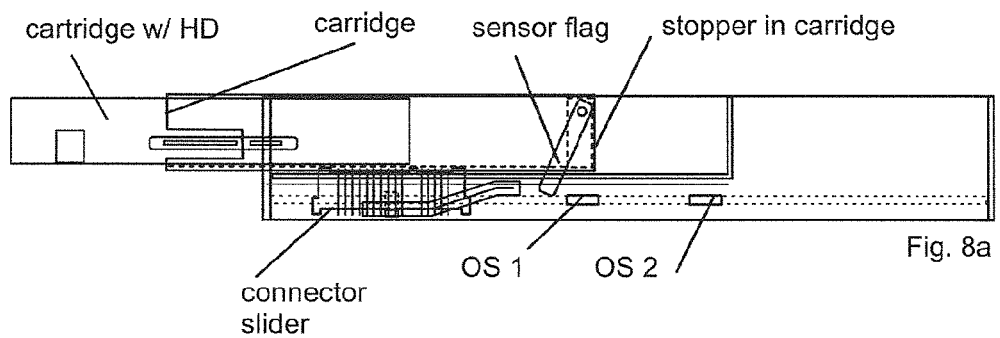

At the same time the electrical connection is done at the contacting side of the multipoint connector blade of the HD (FIGS. 8*a* to F8*c*). The connector is recessed mounted in the housing and accessible via an rectangular opening in the bottom part of the cartridge.

Figure 8B:
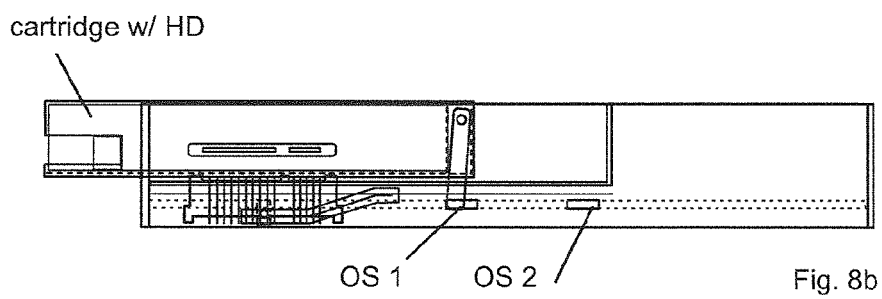
Figure 8C:
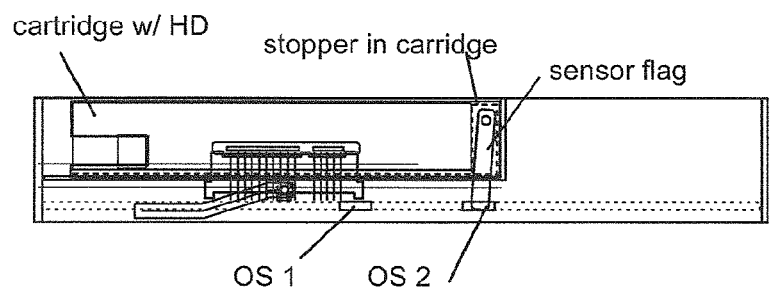

Electrical connection is achieved by means of a spring loaded sort of pogo pin connector slider which is moved up vertically during insertion of the cartridge and pressed on to the individual pins of the HD connector blade (FIG. 8a to FIG. 8c).

The pogo pin connector slider is running in a groove (FIG. 5) in the docking station housing parallel to the insertion direction of the cartridge. The individual pins of the male multipoint connector are routed to a flat cable which itself is connected to a PWB which is located on the bottom side of the housing and is acting as a trailing cable.

Inserting the cartridge into the carriage only is possible in a defined position of the cartridge towards the receptacle as a corner section of the cartridge only allows a full insertion into the carriage when meeting the corresponding cutout (see FIG. 1 and FIG. 3).

Figure 7A:
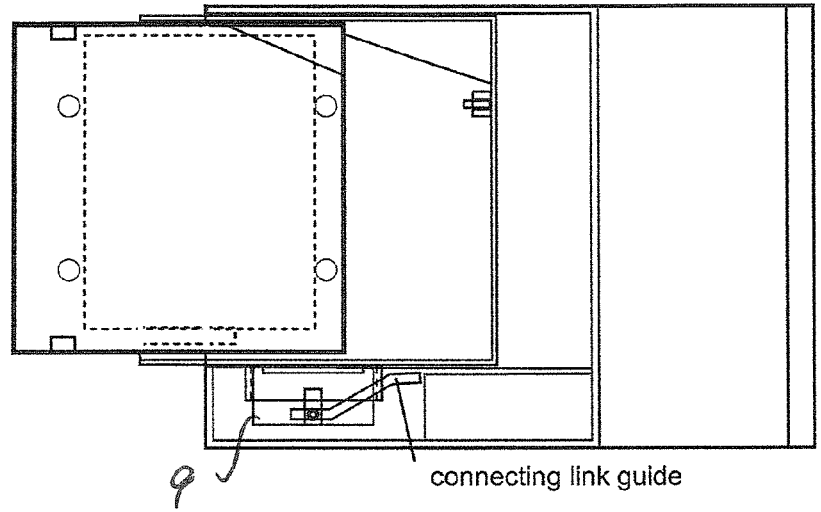
FIGS. 7a-7c show a top view of the docking station when moving a cartridge into the docking station.
Figure 7B:
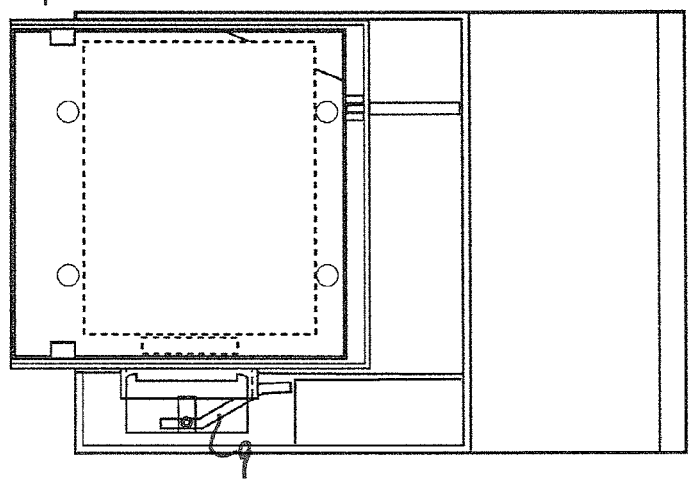
Figure 7C:
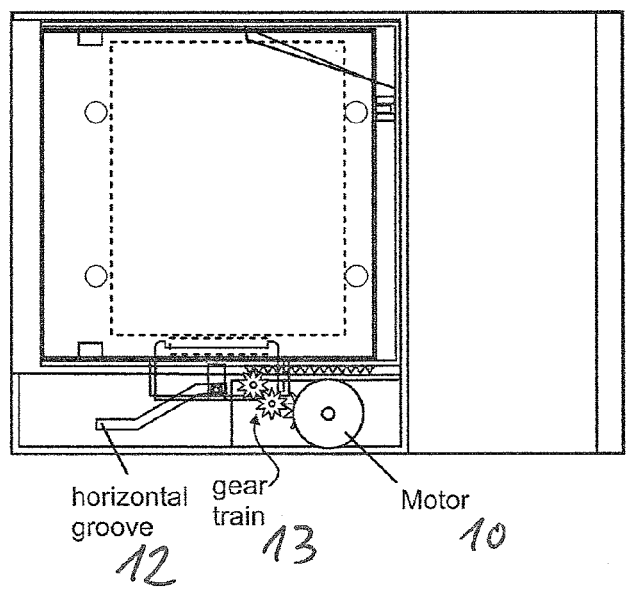

Insertion can be achieved in two steps:

A first step is reached when the cartridge is inserted manually or by a robotic until a mechanical stop at the end of the carriage is encountered. At this position a optical sensor flag (OS1) is reached signalling to the electronic on the interface board (mounted in the bottom of the docking station see FIG. 5) to activate a carriage motor. As a consequence the motor is started, moving the carriage along with the cartridge by means of a rack and pinion drive or gear train (see FIG. 7c) to a second stop which is signalled to the electronic by means of a second optical sensor (OS2).

At this point in time the electrical connection of the pogo pins to the connector blade of the HD fully is given and the HD may be operated as desired. To achieve a contact first the mouth piece is moved with a fixing slider along the horizontal groove to encompass the connector. Then or in parallel the pogo pins are moved along a second groove with a connector slider to establish a contact from below.

Removing the cartridge is possible by firstly removing the pogo pins and the fixing slider and then by moving the carriage to its outer position which is signalled by a signal to the mother board of the docking station.

The motor is moving out the carriage along with the cartridge until the position of the first optical sensor is reached by the flag. The flag is composed of an optical sensor lever which is guided in a cut out when the cartridge is in the carriage and transported into the docking station.

At this point the cartridge may be removed manually or by means of a robotic. The gripper fingers can grip into a recess formed in the cartridge (FIG. 4) to pull out the cartridge.

Via the optical sensor OS 1 the docking station is informed that the cartridge is removed.

FIGS. 9a to 9c disclose details of the mouth piece. The mouth piece has left and right encompassing u-shaped or L-shaped sections holding the left and right edges of the multipoint connector.

Furthermore the mouth piece has an upper/top connecting link, connecting the right with the left encompassing section, to limit the movements of the multipoint connector into the upper direction.

Furthermore the mouth piece has a bottom connecting link, connecting the right with the left encompassing section, wherein the bottom connection link has a recess through which the connector can extend to allow a contact with the electrical multipoint connector. Furthermore a moving pin is located on a surface of the connector, by which the mouth piece is move towards the connector. Furthermore a guiding rail is provided by which the possible movements are restricted to a limited direction.

Figure 10A:
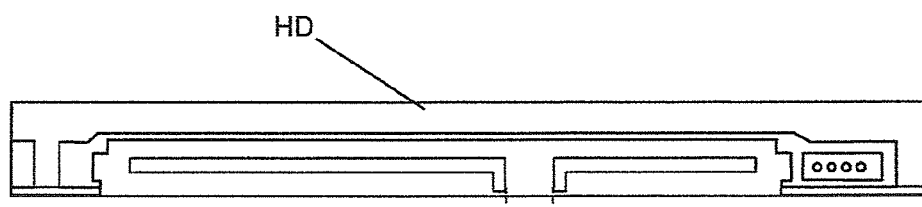
FIG. 10a shows a side view of the hard-disk with the connection pads.
Figure 10B:
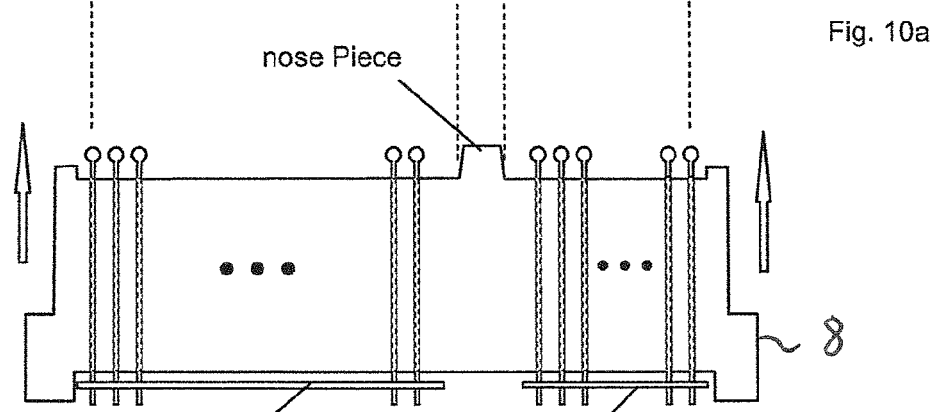
FIG. 10b shows an electrical multipoint connector.
Figure 10C:
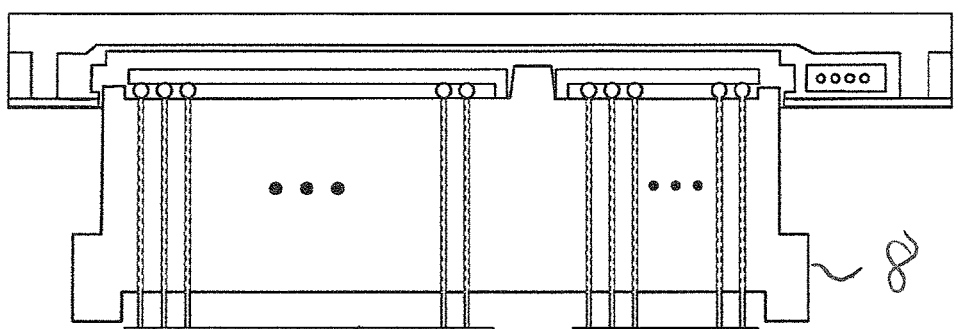
FIG. 10c shows the multipoint connector being in contact with the connection pads.

FIGS. 10a to 10c show the spring loaded connector slider. The contact pins are connected to a flexible flat cable, which allows hundreds of movements without breaking. Between the contact pins, a protruding nose piece is located to be moved in a gap of the multipoint connector of the hard disk based on the SATA/SAS standard.

FIG. 11 shows the front opening/horizontal opening in the cartridge housing through which the fixing slider is moved. The fixing slider has recessed bearing area which is moved over the multipoint connector and protruding pins to limit the horizontal movement avoiding a damage of the multipoint pins. The moving pin is used to move the fixing slider.

Figure 11A:
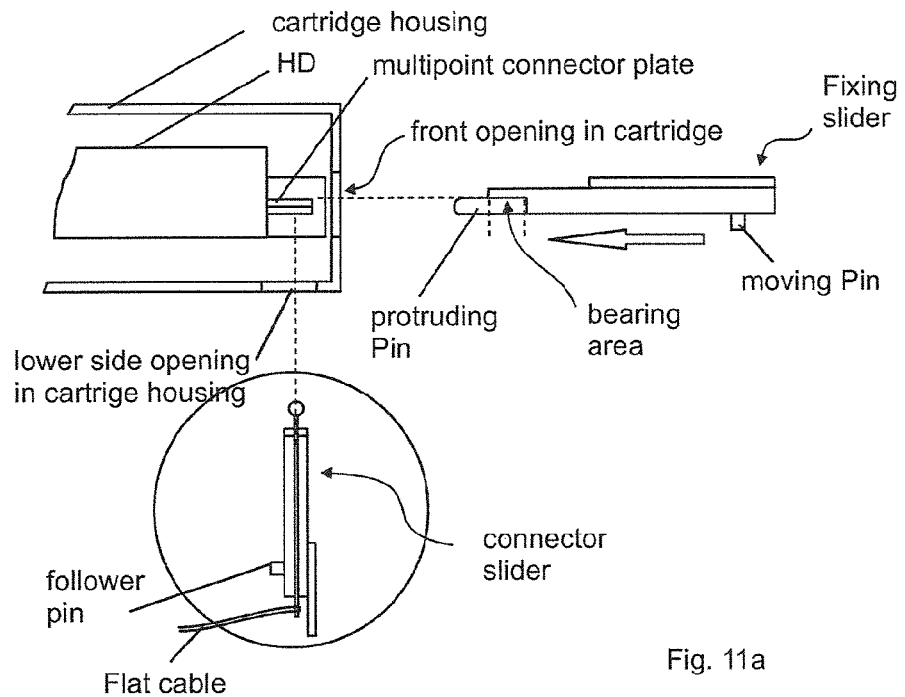
FIG. 11a-11d show details of the resilient spring loaded contact pins of the multipoint connector.
Figure 11B:
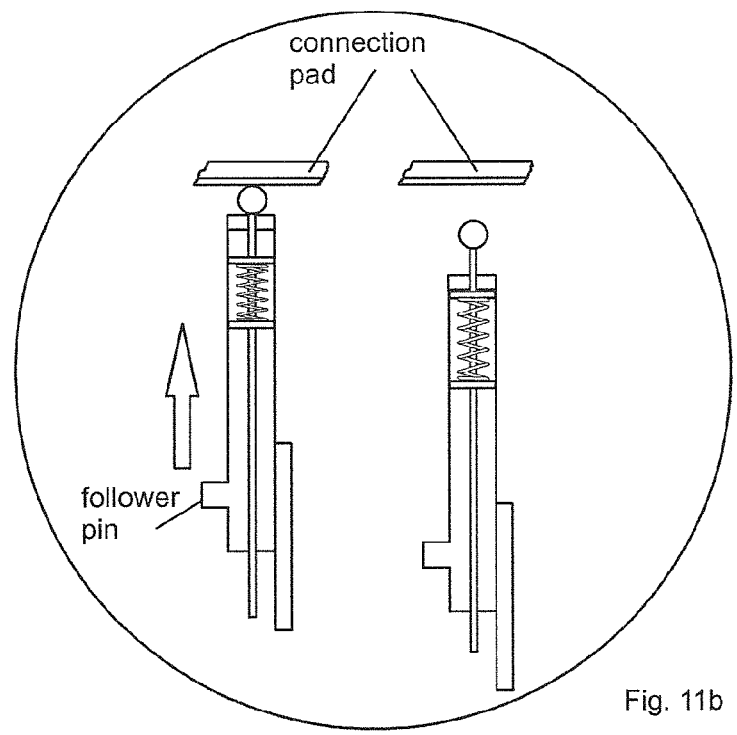
Figure 11C:
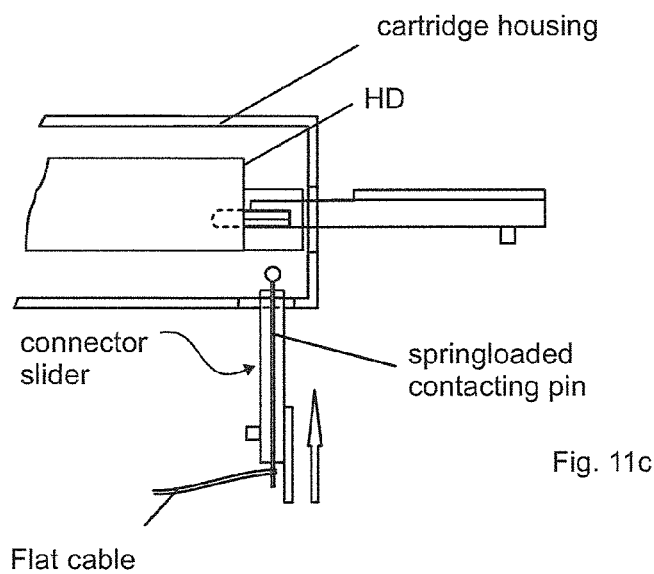
Figure 11D:
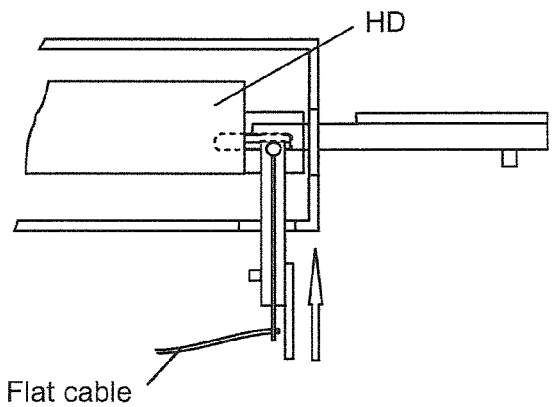

Through the lower opening/vertical opening the connector slider is moved with the contact pins. The contact pins are pushed vertically by a resilient member as it can be seen from FIG. 11b. A follower pin is used to guide the connector slider. FIG. 11c and FIG. 11d show the connector slider in different position when moving vertical upwards through the vertical opening to contact the multipoint connectors. When contacting the pads of the multipoint connector the resilient member is under tension.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. A docking station for receiving a cartridge including a non-tape storage medium, the cartridge having a horizontal access side opening and a vertical access bottom opening so as to expose an electrical multipoint connector of the non-tape storage medium, wherein contact pads of the multipoint connector are accessible through the vertical access bottom opening, the docking station comprising:
    a housing including a receiving space configured to receive the cartridge;
    a movable carriage disposed in the receiving space and configured to transport the cartridge into the receiving space;
    a movable mouth piece configured to at least partially surround the multipoint connector through the horizontal access side opening so as to fix the multipoint connector in a predetermined position in at least two dimensions;
    a fixing slider configured to move the mouth piece through the horizontal access side opening so as to fix the multipoint connector within the receiving space;
    a connector slider configured to move a connector within the docking station through the vertical access bottom opening against the electrical multipoint connector of the cartridge after the fixing slider has fixed the cartridge.

2. The docking station of claim 1, wherein the cartridge has dimensions according to a Linear Tape-Open (LTO) standard, and wherein the horizontal access side opening is disposed on a smaller side of the cartridge and the vertical access bottom opening is disposed on a larger bottom side of the cartridge.

3. The docking station of claim 1, wherein the docking station includes a dimension of a linear Tape-Open (LTO) drive in at least one of 5¼" inch half height and full height so as to replace a tape drive.

4. The docking station of claim 1, further comprising a controller configured to emulate a tape cartridge on the non-tape-storage medium so as to allow a legacy application to store and read data from the non-tape-storage medium using tape read and write commands.

5. The docking station of claim 1, further comprising at least one of the following host connectors: Internet Small Computer System Interface (ISCSI), fiber channel, Small Computer System Interface (SCSI) and Serial Attached SCSI (SAS).

6. The docking station of claim 1, wherein the horizontal side opening and the vertical bottom opening are connected to each other.

7. The docking station of claim 1, wherein the non-tape storage medium is disposed on shock absorbers within the cartridge.

8. The docking station of claim 1, wherein the carriage is configured to be dragged automatically into the docking station after a sensor is triggered by the cartridge being pushed into the carriage.

9. The docking station of claim 8, further comprising at least one of a carriage motor and a resilient member configured to drag the cartridge after a sensor flag is triggered by the cartridge.

10. The docking station of claim 1, wherein the fixing slider is configured to move within a horizontal groove so as to allow a horizontal displacement of the mouth through the horizontal side opening.

11. The docking station of claim 10, wherein the fixing slider is linked to the carriage so as to be moved together with the carriage.

12. The docking station of claim 10, wherein the fixing slider is linked to the carriage motor so as to be moved together with the carriage.

13. The docking station of claim 1, wherein the connector slider is configured to move within a vertical groove so as to allow a vertical displacement of the connector and contact the electrical multipoint connector from a bottom side of the cartridge through the vertical access bottom opening.

14. The docking station of claim 13, wherein the connector slider is linked to the carriage so as to be moved together with the carriage.

15. The docking station of claim 13, wherein the fixing slider is linked to the carriage motor so as to be moved together with the carriage.

16. The docking station of claim 1, wherein the mouth piece includes a left encompassing section and a right encompassing section that are at least one of a u-shaped and an L-shaped section and are configured to respectively bold a left edge and a right edge of the multipoint connector.

17. The docking station of claim 16, wherein the mouth piece includes an upper connecting link that connects the right encompassing section with the left encompassing section.

18. The docking station of claim 16, wherein the mouth piece includes a bottom connecting link that connects the right encompassing section with the left encompassing section, wherein the bottom connection link has a recess for the connector extending through the vertical access bottom opening so as to allow a contact with the electrical multipoint connector.

19. A cartridge receivable at a docking station, the cartridge comprising:
a housing including anon-tape storage medium having an electrical multipoint connector, the housing including a horizontal access side opening and a vertical access bottom opening so as to expose the electrical multipoint connector of the non-tape storage medium, the vertical access bottom opening having a dimension configured to allow access of an electrical connector provided in the docking station.

20. The cartridge of claim 19, wherein the cartridge has dimensions according to a Linear Tape-Open (LTO) standard, and wherein the horizontal access side opening is disposed on a smaller side of the cartridge and the vertical access bottom opening is disposed on a larger bottom side of the cartridge.

21. The cartridge of claim 19, wherein the horizontal side opening and the vertical bottom opening are connected to each other.

22. The cartridge of claim 19, wherein the non-tape storage medium is disposed on shock absorbers within the cartridge.

* * * * *